United States Patent
Ji et al.

(10) Patent No.: US 10,423,580 B2
(45) Date of Patent: Sep. 24, 2019

(54) STORAGE AND COMPRESSION OF AN AGGREGATION FILE

(71) Applicant: INTERNATIONAL BUSINESS MACHINES CORPORATION, Armonk, NY (US)

(72) Inventors: Hai Ji, Beijing (CN); Yuan Yuan Li, Beijing (CN); Xiaoyang Yang, San Francisco, CA (US); Chun Guang Zeng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 14/926,355

(22) Filed: Oct. 29, 2015

(65) Prior Publication Data
US 2016/0124984 A1  May 5, 2016

(30) Foreign Application Priority Data

Oct. 30, 2014  (CN) .......................... 2014 1 0601667

(51) Int. Cl.
*G06F 17/30* (2006.01)
*G06F 16/17* (2019.01)

(52) U.S. Cl.
CPC .................. *G06F 16/1727* (2019.01)

(58) Field of Classification Search
CPC ....................................................... G06F 17/30
USPC ................................................ 707/662, 822
See application file for complete search history.

(56) References Cited

U.S. PATENT DOCUMENTS

| | | | |
|---|---|---|---|
| 6,021,415 A | 2/2000 | Cannon et al. | |
| 6,112,211 A * | 8/2000 | Bradshaw | ............. G06F 3/0608 |
| 7,418,646 B2 | 8/2008 | Douglas | |
| 7,660,834 B2 * | 2/2010 | Cannon | ............... G06F 17/3023 |
| | | | 707/609 |
| 2007/0043608 A1* | 2/2007 | May | ................... G06Q 10/0633 |
| | | | 705/7.27 |
| 2008/0077988 A1* | 3/2008 | Small | .................. G06F 11/3476 |
| | | | 726/22 |
| 2011/0106806 A1 | 5/2011 | Tamas | |

FOREIGN PATENT DOCUMENTS

| | | |
|---|---|---|
| CN | 102024017 A | 4/2011 |
| CN | 102708107 A | 10/2012 |
| CN | 103077166 A | 5/2013 |

* cited by examiner

*Primary Examiner* — Baoquoc N To
(74) *Attorney, Agent, or Firm* — Grant M. McNeilly

(57) ABSTRACT

A method and system for storage of an aggregation file and method and system for compression of the same. The method for compressing an aggregation file includes: acquiring the aggregation file to be compressed; copying remaining files in the acquired aggregation file into a new aggregation file based on metadata of a deleted object stored in a deletion file corresponding to the acquired aggregation file; and removing the acquired aggregation file. The present invention also provides a system for compressing an aggregation file and a method and system for storing an aggregation file.

18 Claims, 9 Drawing Sheets

STORAGE AND COMPRESSION OF AN AGGREGATION FILE

CROSS-REFERENCE TO RELATED APPLICATION

This application claims priority under 35 U.S.C. § 119 from Chinese Patent Application No. 201410601667.7 filed Oct. 30, 2014, the entire contents of which are incorporated herein by reference.

TECHNICAL FIELD OF THE INVENTION

The present invention relates to storage and compression of aggregation file, and more specifically, to a method and system of compressing aggregation file to recollect storage space.

BACKGROUND OF THE INVENTION

With the development of digital techniques, especially with the widespread application of the internet, the amount of digital files are increasing explosively every day. Storing and managing the data files being produced daily is increasingly problematic. To solve this problem, small files totaling 0-100 KBs are appended one by one aggregate them into an aggregation file, which is then stored. That is, the small files are stored one by one until the aggregation file is full. The aggregation file stores a plurality of small files using the append-only technique resulting in the writing process of the small files requiring to be changed from a conventional random disk IO into a sequential disk IO. The index of the plurality of small files can be maintained in memory so that only one physical disk IO is needed to read the small file content, which decreases the file system inode usage.

Furthermore, some small files of the aggregation file may be updated or deleted when being accessed. However, the filling method for the aggregation is based on an append-only technique, which with lapse of the time results in a lot of "unused space" or "deleted space" in a full aggregation file. This "unused space" or "deleted space" cannot be used again directly and causes wasted space. Therefore, it is desired to reclaim the "unused space" or "deleted space" so as to reduce the storing cost and the wasted storage space and then increase the usage of the storage space.

SUMMARY OF THE INVENTION

According to one embodiment of the present invention, there is provided a computer-implemented method of compressing an aggregation file that includes: acquiring the aggregation file to be compressed; copying remaining files in the acquired aggregation file into a new aggregation file based on metadata of a deleted object stored in a deletion file corresponding to the acquired aggregation file; and removing the acquired aggregation file.

According to another embodiment of the present invention, there is provided a system for compressing an aggregation file, including: a memory; a processor communicatively coupled to the memory; and a module for compressing an aggregation file configured to carry out the steps of a method including: acquiring the aggregation file to be compressed; copying remaining files in the acquired aggregation file into a new aggregation file based on metadata of a deleted object stored in a deletion file corresponding to the acquired aggregation file; and removing the acquired aggregation file, thereby producing a compressed aggregation file.

According to another embodiment of the present invention, there is provided a computer system for compressing an aggregation file which includes one or more processors, one or more computer-readable memories, one or more computer-readable tangible storage devices, and program instructions stored on at least one of the one or more storage devices for execution by at least one of the one or more processors via at least one of the one or more memories, wherein the computer system can perform a method which includes the steps of: acquiring the aggregation file to be compressed; copying remaining files in the acquired aggregation file into a new aggregation file based on metadata of a deleted object stored in a deletion file corresponding to the acquired aggregation file; and removing the acquired aggregation file.

According to another embodiment of the present invention, there is provided a computer-implemented method of storing an aggregation file, including: storing a plurality of objects in an aggregation file by using an append-only technique; recording metadata corresponding to the plurality of objects of the aggregation file in an in-memory index corresponding to the aggregation file; and recording metadata corresponding to objects being deleted from the aggregation file in a specific deletion file.

According to another embodiment of the present invention, there is provided a system for storing an aggregation file that includes: one or more aggregation file sections, in which each stores a plurality of objects in an aggregation file by using an append-only technique; one or more in-memory index sections, in which each records metadata corresponding to the plurality of objects of the corresponding aggregation file; and one or more specific deletion file sections, in which each records metadata corresponding to objects being deleted from the corresponding aggregation file.

The present invention uses a dedicated deletion file to hold the deletion information so that the number of times of operating a disk when determining an access would not be more than that when determining the same by using a conventional technique.

BRIEF DESCRIPTION OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

DETAILED DESCRIPTION OF THE PREFERRED EMBODIMENTS

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
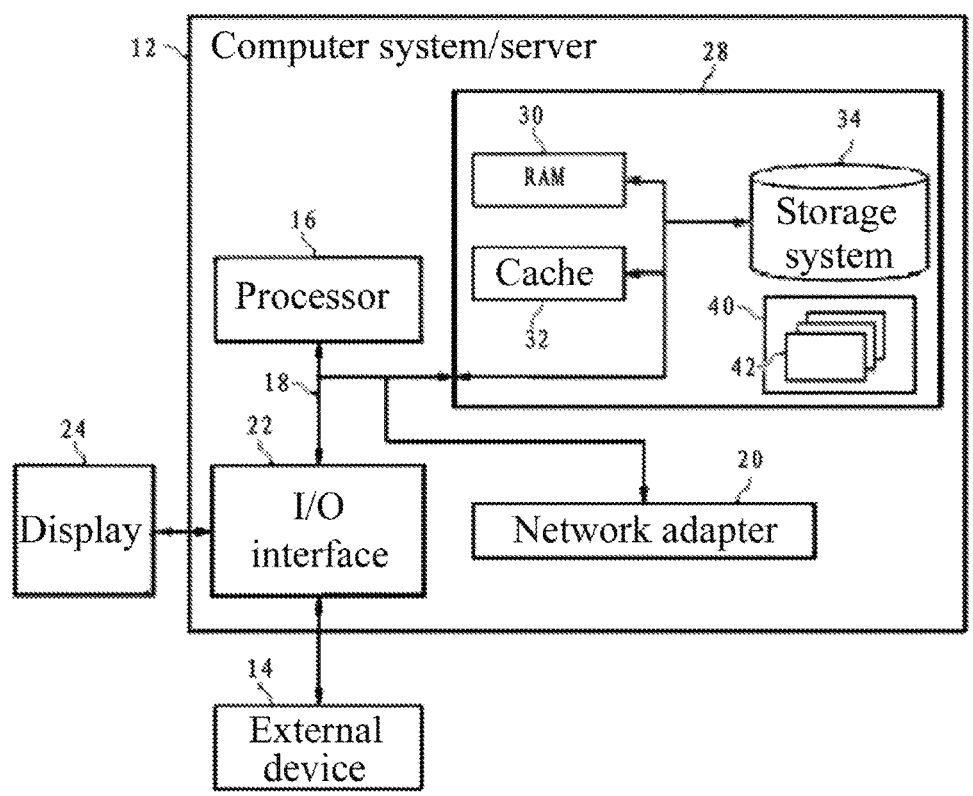
FIG. 1 shows an exemplary computer system which is applicable to implement the embodiments of the present invention.

Referring now to FIG. 1, an exemplary computer system/server 12 applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include one or more processors or processing units 16, system memory 28, and bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. For example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
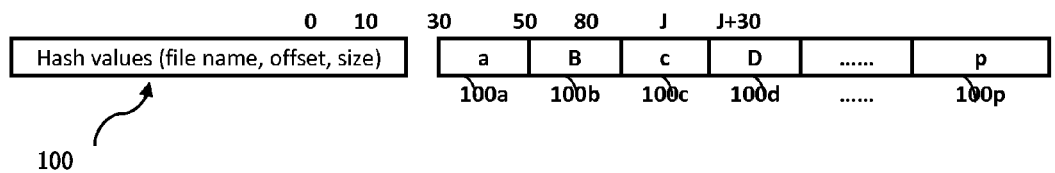
FIG. 2 shows a schematic diagram of the configuration of a conventional aggregation file.

With reference now to FIG. 2, a schematic diagram of the configuration of a conventional aggregation file is show according to an embodiment of the present invention. An aggregation file 100 contains a plurality of small files and each grid indicates a small file such as files 100a-100p.

An aggregation file is often created in advance. In general, an aggregation file is a storage disk or a storage section as a portion of the storage disk, which has a predetermined storage space. An aggregation can be created by a predetermined number of small files to be stored. The plurality of small files of the aggregation file can be stored using an append-only technique. That is, a newly coming small file can be stored and arranged in a location immediately behind the finally stored small file. The new coming small file cannot be stored in a blank location where a deleted small file has been and cannot be stored randomly in any other location of the remaining locations of the aggregation. Once the aggregation file is first filled using the append-only technique, no small files can be added in the aggregation file, regardless of whether the aggregation file has a predetermined storage space or a predetermined number of small files. If there are more files to be stored, a new aggregation file needs to be created even if the old aggregation file has some "deleted spaces" resulting from deleted small files. As a result, in case there is a plurality of aggregation files, only the last aggregation file can continue to store small files using the append-only technique when it has not been filled. Therefore, the storing mode applied in the aggregation file is that the newly coming small files only can be stored in a newly created aggregation file when the aggregation file is full.

As illustrated in FIG. 2, capital letters B and D correspond to grid locations in an aggregation file that once contained small values 100b and 100d that have since been deleted. The numbers on the corresponding boundary line between two adjacent grids indicates offset of a stored small file. All aggregation files have some "deleted gaps" or "deleted holes" left by the deletion of some small files from an aggregation file. Generally, in order to compress the aggregation file so as to reclaim the deleted gaps in the aggregation file, the remaining small files of the aggregation file shall be copied to a new aggregation file. To do this, it is necessary to identify the deleted small files and the remaining small files. As for how to mark a small file being deleted and how to compress the aggregation file to reclaim the spaces left by the deletion of some small files, a conventional approach is to use a flag in a small file. The flag can be assigned to "0" or "1" which indicates whether or not the small file has been in the aggregation file. When the aggregation file is compressed, those small file which are assigned to a flag "0" will be skipped. Obviously, it requires many times of disk IO to determine the deleted small files in an aggregation, which may reduce significantly the efficiency of compressing the aggregation file.

Figure 3:
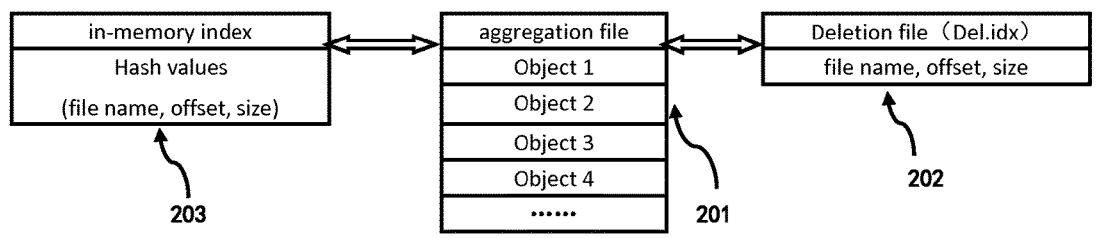
FIG. 3 shows a configuration schematic diagram of the configuration of an aggregation file according to an embodiment of the present invention.

FIG. 3 shows a configuration schematic diagram for the configuration of an aggregation file according to an embodiment of the present invention. The existing art uses a flag value in a small file to indicate whether or not the small file has been deleted. In contrast, FIG. 3 illustrates that in the present invention an aggregation file is stored in aggregation file section 201 and utilizes a dedicated "deletion file" stored in deletion file section 202. Deletion file section 202 records which of the one or more small files have been deleted from the aggregation file. For example, metadata hash values such as file name, offset and file size are recorded in the deletion file. Further, each of the aggregation files corresponds to an in-memory index, which is stored in in-memory index section 203. In the in-memory index, hash values of remaining small files of the aggregation file are contained (hereinafter, the small file and the corresponding hash value is also referred to as an "object").

In general, the object includes file content and metadata such as filename, offset in the aggregation file, file size and so on. Many solutions and products use this type of aggregation file.

For embodiments of the present invention, the aggregation file allows the user to perform operations such as appendant storing, retrieving, reading, copying and deletion. When performing a retrieving operation, the in-memory index corresponding to the aggregation file shall be accessed and checked. If the in-memory index contains metadata of the small file or object being retrieved, such as filename, offset and file size, the object can be read from the aggregation file based on the accessed and checked metadata through one disk IO.

According the present invention, when an object is deleted from an aggregation file, the hash value or metadata in in-memory index 203 may be deleted with the deletion of the objection of the aggregation file, and the metadata corresponding to the deleted object are recorded in a deletion file, "Del.idx" 202. The deletion files store the information on which object(s) are deleted, the location where the deleted object had been, and the size of the deleted object. By using these steps, the present invention departs the deletion operation disk IO from the creation (or append-only storing) and retrieving operation disk IO.

Figure 4:
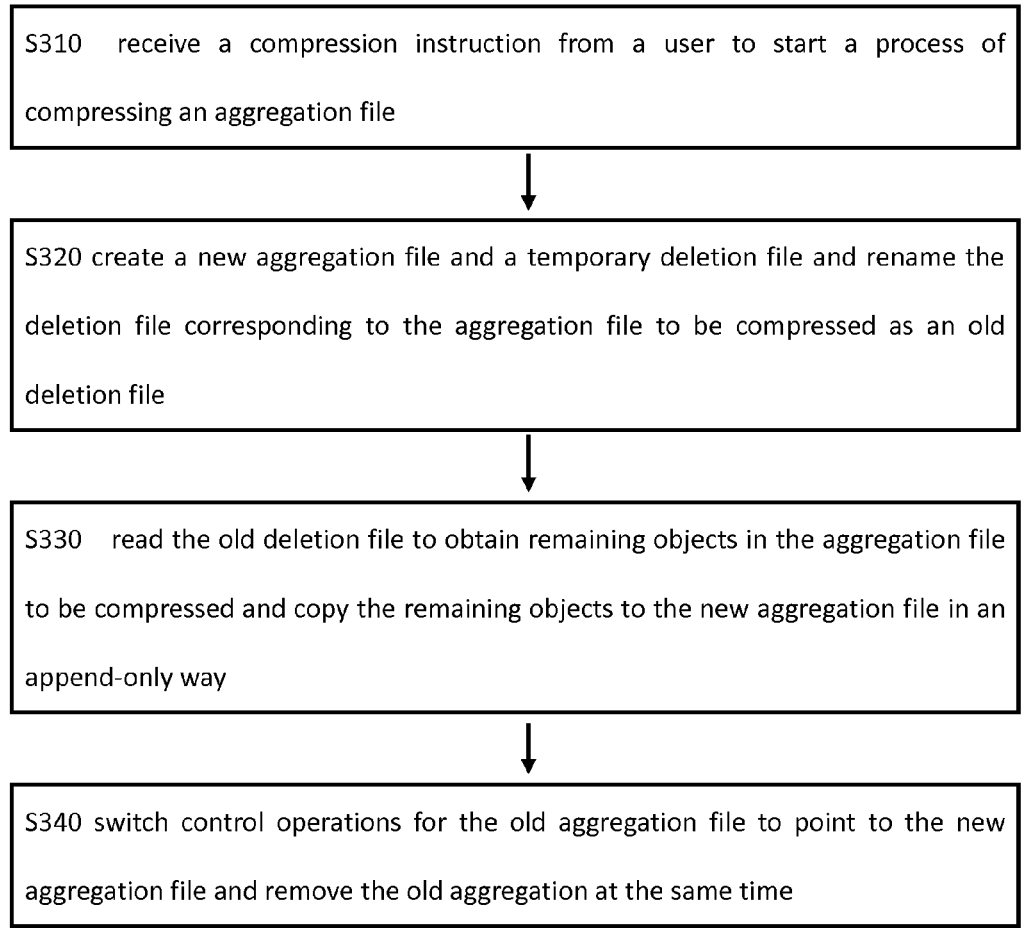
FIG. 4 shows a general flow chat of copying and compressing an aggregation file according to an embodiment of the present invention.

FIG. 4 shows a general flow chart of copying and compressing an aggregation file according to an embodiment of the present invention. In general, if the memory space of a disk is sufficient, it is not necessary to compress the aggregation file to reclaim the storage space which cannot be used again. When the storage space of the disk is insufficient, the aggregation file needs to be compressed. Only the aggregation file that can be retrieved and deleted such as the aggregation file that is filled can be compressed, while the last aggregation, which is not full, cannot be compressed.

As shown in FIG. 4 at step S310, a compression command from a user is received so that a copying and compressing process is started. Then, at step S320, aggregation file creation unit 710 creates a new aggregation file based on the received copying and compressing command. At the same time, deletion file creation unit 720 creates a temporary deletion file corresponding to the newly created aggregation file based on the received copying and compressing command. The temporary deletion file will be renamed as a new deletion file after the copy processing is finished. At the same time, renaming unit 760 renames the deletion file corresponding to the aggregation file being compressed as old deletion file 202. At step 330, aggregation file copying unit 740 performs the compression processing. Aggregation file copy unit 740 can perform one disk IO to read old deletion file 202 so as to obtain which objects of the aggregation file to be compressed had been deleted and cannot be copied and the remaining objects being able to be copied. Finally, at step S340, switch unit 790 switches all the controlling operations for the old aggregation file to point to newly created aggregation file 201. At the same time, removing unit 750 removes old aggregation file 201 so as to complete the compression of the aggregation file and thus reclaim the deleted spaces unable to be used again from the old aggregation.

Figure 5:
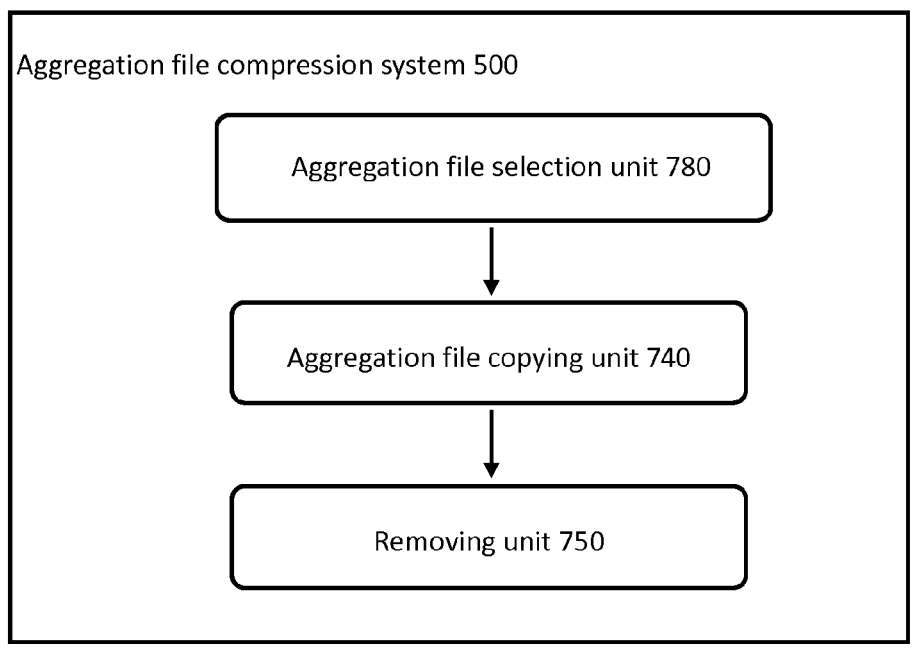
FIG. 5 shows a block diagram of compressing an aggregation file according to an embodiment of the present invention.

FIG. 5 shows a block diagram of compressing an aggregation file according to an embodiment of the present invention. As shown in FIG. 5, aggregation file compression system 500 includes: aggregation file selection unit 780 configured to select an aggregation file to be compressed according to a request from a user; aggregation file copy unit 740 configured to copy the remaining objects of a selected aggregation file to a new aggregation file based on the metadata in a deletion file; and removing unit 750 configured to remove the selected aggregation file after the copying processing is completed.

Figure 6:
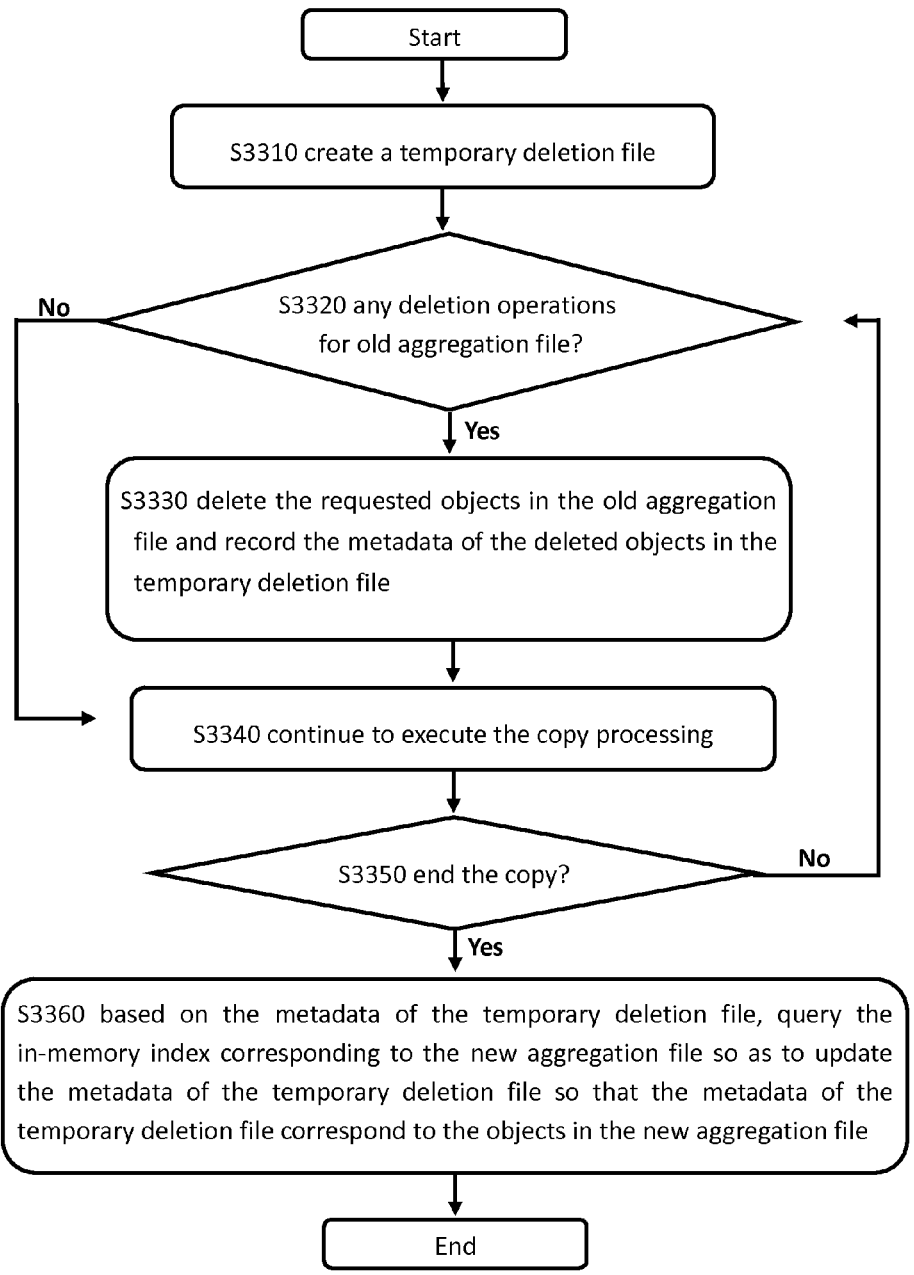
FIG. 6 shows a flow chat of compressing an aggregation file according to an embodiment of the present invention.

FIG. 6 is a flow chart of compressing an aggregation file according to an embodiment of the present invention. As shown in FIG. 6, at the step S3310, deletion file creation unit 720 (shown in FIG. 5) creates a temporary deletion file. Then, at step S3320, aggregation file copying unit 740 (shown in FIG. 5) performs a compression processing to determine whether or not there is a deletion operation request for the old aggregation file being copied. If there is a deletion operation request for the old aggregation file being copied, the process proceeds to Step S3330. At step S3330, one or more objects in the older aggregation file can be deleted in response to the deletion operation request while aggregation file copying unit 740 can store the metadata of the objects being deleted in the temporary deletion file. Then, at step 3340, aggregation file copying unit 740 continues to perform other steps of the copy processing. However, if at step 3320 it is determined that there is no deletion operation request for the old aggregation file being copied, the process proceeds to step S3340 directly. At step 3350, it is determined whether the copying of all the remaining objects of the old aggregation file has been completed. If copying has been completed, the process proceeds to step S3360. Otherwise, the process returns to Step S3320. At step S3360, a querying and updating unit 770 (shown in FIG. 5) queries metadata in an in-memory index corresponding to the new aggregation file based on the metadata in temporary deletion file 202 (shown in FIG. 3) and updates the metadata in temporary deletion file 202 based the querying result. Simultaneously, deletion unit 810 (shown in FIG. 9) deletes the corresponding object(s) forming the new aggregation file in-memory index 203 (shown in FIG. 3) so that the metadata in the temporary deletion file corresponds to the objects in the new aggregation file. Thereby, the deletion operations occurring in the copying and compressing process can be ended. During the copying and compressing process, the retrieval and deletion operations with respect to the objection are performed in the old aggregation file.

Although the deletion operation is described as operation steps in the copying and compressing process, the deletion operation might not happen during implementing the copying and compressing process of the present invention. To simplify the flow, the deletion operation can be inhibited during the copying and compressing process of the present invention and only step S3340 can be executed.

Figure 7:
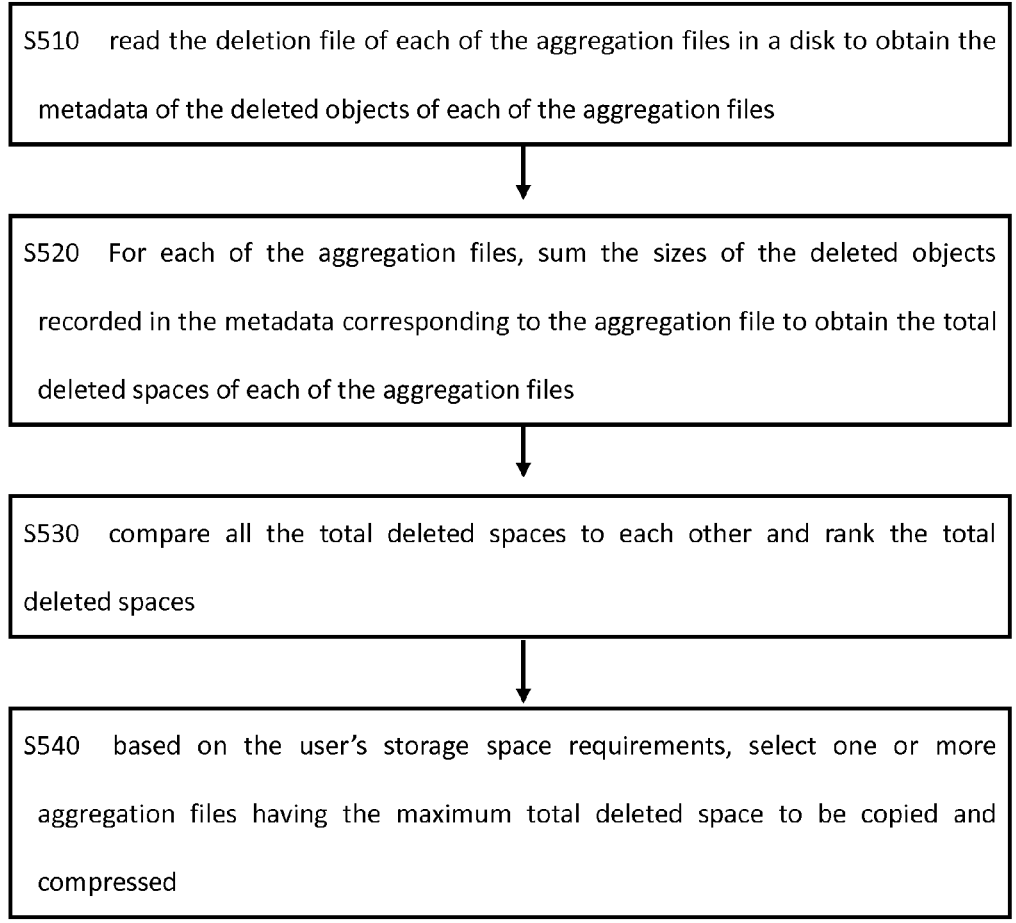
FIG. 7 shows a flow chat of selecting an aggregation file to be copied and compressed according to an embodiment of the present invention.

FIG. 7 shows a flow chart of selecting an aggregation file to be copied and compressed according to an embodiment of the present invention. Before copying and compressing the aggregation file, an aggregation file selection unit 780 (shown in FIG. 5) selects an aggregation file to be copied and compressed based on the user's requirements. Generally, since there are a lot of aggregation files in a disk, some of the aggregation files have deleted spaces to be reclaimed. Therefore, when the storage space of the disk is insufficient, the user shall compress one or more aggregation files to meet with storage space requirements.

As shown in FIG. 7 at step S510, the aggregation file selection unit 780 (shown in FIG. 5) accesses a plurality of deletion files corresponding to a plurality of aggregation files respectively, so as to obtain the metadata of the deleted objects in each of the plurality of aggregation file 201 (shown in FIG. 3). At step S520, for each aggregation file, the sizes of the deleted objects recorded in the metadata are summed to obtain a total deleted space of each of the plurality of aggregation files 201. At step S530, the total deleted space of the plurality of aggregation files 201 are compared to each other and ranked. At step S540, based on the user's requirements on storage space, one or more aggregation files having maximum total deleted space are selected to be copied and compressed.

Figure 8:
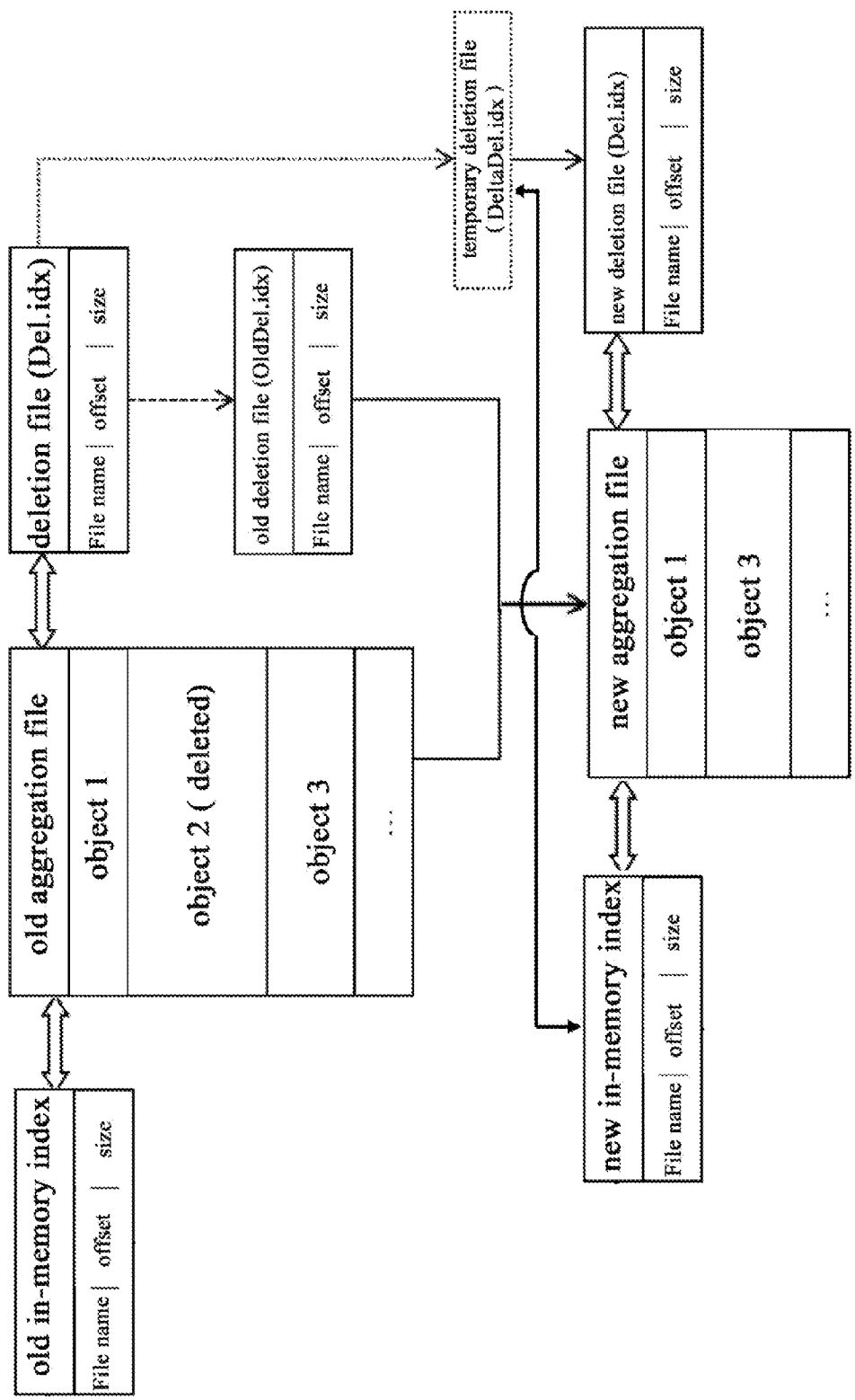
FIG. 8 shows a schematic block diagram of copying and compressing an aggregation file according to an embodiment of the present invention.

FIG. 8 shows a schematic block diagram of copying and compressing an aggregation file according to an embodiment of the present invention. As shown in FIG. 8, the old aggregation file has object 2 to be deleted. When the copying and compressing processing is performed on the old aggregation file, the deletion file "Del.idx" corresponding to the old aggregation file is renamed as an old deletion file "OldDel.idx". In performing the copying and compressing process, hash values in the old deletion file are read to determine the remaining objects of the old aggregation file and offsets thereof. Then, the remaining objects are copied to a new aggregation file. If a deletion operation occurs in performing the copying and compressing process, the deletion operation is performed in the old aggregation file and the metadata of the deleted objects are recorded in a temporary deletion filed "DelDel.idx". If some objects to be deleted have been copied to the new aggregation before the deletion operations occurs, after the deletion operation completes, the offset of the deleted object recorded in an in-memory index corresponding to the new aggregation file is an offset of the object in the new aggregation file while the offset of the deleted object recorded in the temporary deletion filed "DelDel.idx" is the offset of the deleted object in the old aggregation file. Thus, it is necessary to correct the offset of the deleted object recorded in the temporary deletion filed "DelDel.idx". To do this, one or more new offsets (i.e. the offsets of the objects in the new aggregation file) can be obtained by querying and checking the new in-memory index corresponding to the new aggregation file based the temporary deletion file and the offsets of the deleted objects recorded in the temporary deletion file "Del Del.idx" can be updated based on the new offsets so that the new deletion file "Del.idx" can be obtained and correspond to the new aggregation file.

Figure 9:
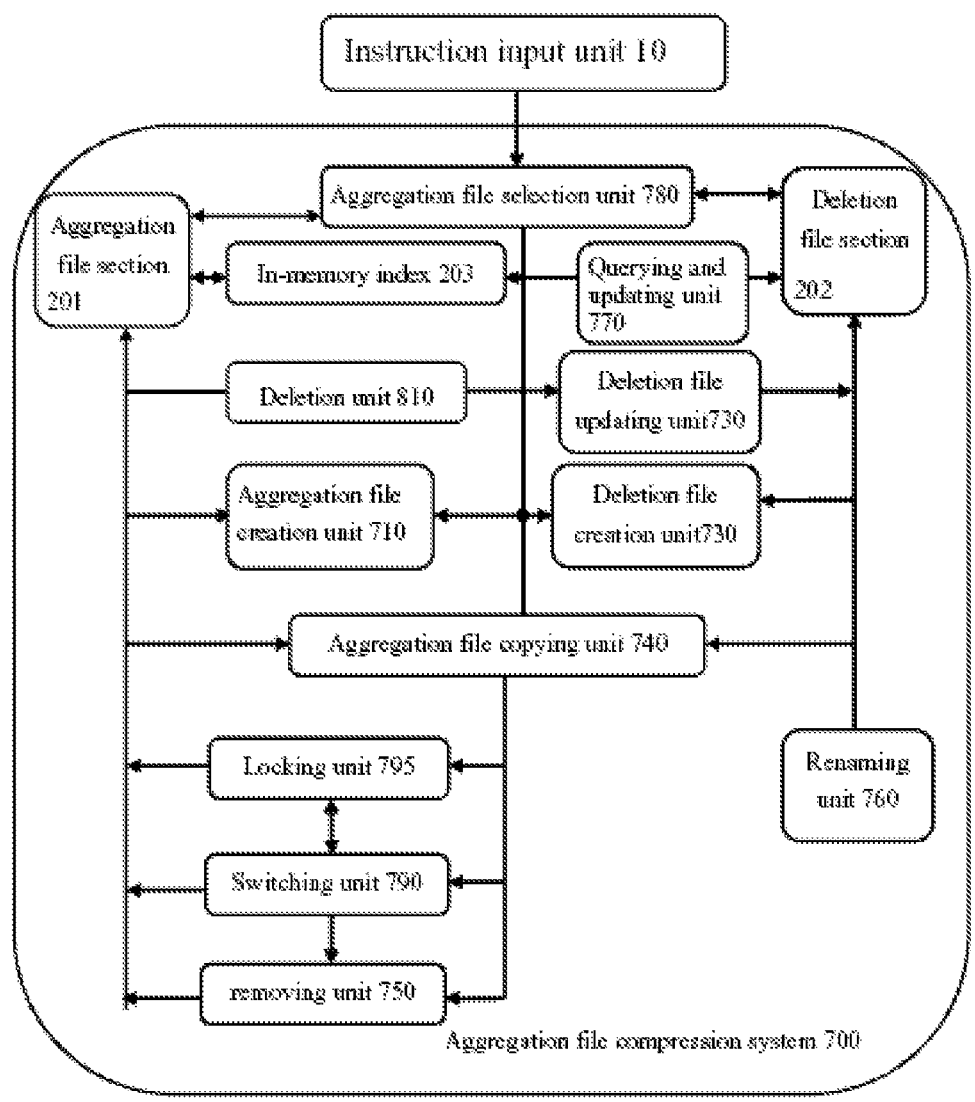
FIG. 9 shows a schematic block diagram of a storage system for copying and compressing an aggregation file according to an embodiment of the present invention.

FIG. 9 shows a schematic block diagram of a storage system for copying and compressing an aggregation file according to an embodiment of the present invention. As shown in FIG. 9, a copying and compressing system 700 includes: aggregation creation unit 710 configured to create an aggregation file with a predetermined size; deletion file creation unit 720 configured to create a deletion file corresponding to the aggregation file; deletion file updating unit 730 configured to record metadata corresponding to the deleted object in the deletion file corresponding to the aggregation file when one or more objects are deleted from the aggregation file; aggregation copying unit 740 configured to copy the remaining objects into a new aggregation file based on the metadata of the deletion file; and removing unit 750 configured to remove the copied aggregation file.

The copying and compressing system 700 further includes: renaming unit 760 configured to rename a deletion file corresponding to an aggregation file to be copied as an old deletion file based on an user's instruction of copying the aggregation file. In addition, based on the user's instruction of copying the aggregation file, aggregation creation unit 710 creates a new aggregation file while deletion file updating unit 730 creates a temporary deletion file corresponding to the newly created aggregation file.

The copying and compressing system 700 further includes: querying and updating unit 770 configured to query metadata in an in-memory index corresponding to the new aggregation file based on the metadata in the temporary deletion file so as to update the metadata in the temporary deletion file corresponding to the new aggregation file; deletion unit 810 configured to delete the corresponding object(s) in the new aggregation file so that the metadata in the temporary deletion file correspond to the objects of the new aggregation file; aggregation file selection unit 780 configured to, before copying the aggregation file, calculate a total deleted space of each of the aggregation files based on the metadata recording in each of the deletion files and select one or more aggregation files having maximum total deleted space as aggregation files to be copied and compressed; switch unit 790 configured to, after the copying completes, switch all the controlling operations for the old aggregation file to point to the newly created aggregation file; and locking unit 795 configured to lock the deletion operations for all the objects in both the new aggregation file and the old aggregation file when the switching between the new aggregation file and the old aggregation files is being performed.

According to the above description of the present invention, the present invention provides an alternative method and system which marks the deleted objects of an aggregation file and reclaims the storage spaces left by the deleted objects. In the present method, no flags are used in the objects included in the aggregation file, but a dedicated deletion file is use to record the deletion information. Specifically, a separate file is used to store the relevant metadata of the deleted objects of the aggregation file. By this manner, when determining which objects of the aggregation file to be copied do not exist, the dedicated deletion file according to the present invention need less times of disk IO than that of the prior art.

The present invention can use another disk to store the dedicated deletion files. In case that the aggregation file and the corresponding deletion file are stored in different disks, the access to the dedicated deletion file cannot affect the sequential disk writing of the aggregation file, which means that the performance of present invention is better than that of the existing art using a deletion flag in an object.

Since the dedicated deletion file records the offset and size of the deleted object, the copying and compressing method according to the present invention can use the dedicated deletion file to obtain easily the total space of all the deleted objects in the aggregation file to be copied and compressed and the locations of the deleted objects in the old aggregation file. Thereby, the total deleted space of each of the aggregation files can be obtained by summing the sizes of the deleted objects which are recorded in the deletion file corresponding to the aggregation file, which is helpful to the aggregation file owner to choose which aggregation file(s) should be compressed. When the reclaimed space is sufficient, the compression processing can complete.

In the prior art, since a flag is used in the object to indicate whether or not the object is deleted, it is difficult to once determine which remaining objects in an aggregation file are sequential. In fact, it is necessary to make certain what the flag of each of the remaining objects in the aggregation file is so as to determine which remaining objects in an aggregation file are sequential. Accordingly, in case that the flag is set in the objects of the aggregation file according to the prior art, when the aggregation file is compressed, the user cannot know where the deleted spaces are. Therefore, it is necessary to read the objects one by one and copy or skip the objects by determining the object's flags, which cause the compressing speed slower than the present invention. To the contrary, the present invention uses the dedicated deletion file and thus can once obtain which remaining objects in an aggregation file are sequential from the deletion file. Therefore, during the compression processing, a large block of sequential remaining objects in the aggregation file can be copied once by a sequential disk reading, which can speed the copy of the remaining objects. Further, with the dedicated deletion file, the switch time can be very short although the compression time is slightly long. In addition, the disk storing the aggregation file can be different from the one storing the corresponding deletion file.

If the system is written heavy and read rarely, the present invention can keep sequential disk IO because only one aggregation file is written. For some objects, the sequential disk IO means better performance and shorter response time.

However, in case of the way of using flags in the objects of the aggregation file according to the prior art, one deletion operation needs one disk IO. To the contrary, the present invention can combine multiple logical deletion disk IO to one physical disk IO if there are many deletion operations for one aggregation file at one time and the worst situation is one disk IO per deletion operation because the write head need not skip back and forth when the deletion file is stored in a disk different from that of the aggregation file.

According to the present invention, when a switch is performed between the old aggregation file and the new aggregation file, both the new aggregation file and the old aggregation file shall be locked to prevent from new deletion operations. Since the time for switching is very short under the method of copying and compressing the aggregation file according to the present invention, the effect on the using of the aggregation file caused by the locking is very low. After switching, all the operations for the old aggregation file point to the new aggregation file, the in-memory index and the deletion file thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for compressing an aggregation file, comprising:
    acquiring the aggregation file to be compressed, comprising:
        calculating total deleted space of the respective aggregation file; and
        selecting the aggregation file having the maximum total deleted space as the aggregation file to be compressed;
    copying remaining files in the acquired aggregation file into a new aggregation file based on metadata of a deleted object stored in a deletion file corresponding to the acquired aggregation file; and
    removing the acquired aggregation file.

2. The computer-implemented method according to claim 1, wherein copying the remaining files in the acquired aggregation file into the new aggregation file further comprises:
    creating a temporary deletion file different from the deletion file corresponding to the acquired aggregation file.

3. The computer-implemented method according to claim 2, further comprising:
    executing a new deletion operation in the acquired aggregation file and recording the metadata of the deleted object of the new deletion operation in the temporary deletion file in response to a new deletion operation occurring during copying of the remaining files in the acquired aggregation file into the new aggregation file.

4. The computer-implemented method according to claim 3, further comprising:
    querying the metadata of the new aggregation file by using the metadata of temporary deletion file so as to update the metadata of the temporary deletion file; and
    deleting one or more objects corresponding to the metadata of temporary deletion file from the new aggregation file so that the object of the temporary deletion file corresponds to that of the new aggregation file.

5. The computer-implemented method according to claim 4, further comprising:
    using the temporary deletion file as a new deletion file corresponding to the new aggregation file.

6. The computer-implemented method according to claim 4, wherein the metadata comprises at least one of a: filename of the object, offset of the object in the aggregation file and size of the object in the aggregation file.

7. The computer-implemented method according to claim 1, wherein copying the remaining files in the acquired aggregation file into the new aggregation file comprises:
    determining the position(s) of the deleted objects(s) based on the deletion file corresponding to the acquired aggregation file so as to copy the aggregation file by reading sequentially one or more large blocks(s) containing a plurality of remaining objects.

8. A system for compressing an aggregation file, comprising:

a memory;

a processor communicatively coupled to the memory; and a module for compressing an aggregation file configured to carry out the steps of a method comprising:

acquiring the aggregation file to be compressed, comprising calculating total deleted space of the respective aggregation file; and selecting the aggregation file having the maximum total deleted space as the aggregation file to be compressed;

copying remaining files in the acquired aggregation file into a new aggregation file based on metadata of a deleted object stored in a deletion file corresponding to the acquired aggregation file; and removing the acquired aggregation file, thereby producing a compressed aggregation file.

9. The system according to claim 8, wherein the method further comprises the step of:

creating a temporary deletion file different from the deletion file of the acquired aggregation file during copying the remaining files in the acquired aggregation file into the new aggregation file.

10. The system according to claim 9, wherein the method further comprises the step of:

executing the new deletion operation in the acquired aggregation file and record the metadata of the deleted object of a new deletion operation in the temporary deletion file in response to the new deletion operation occurring during copying the remaining files in the acquired aggregation file into the new aggregation file.

11. The system according to claim 10, wherein the method further comprises the steps of:

querying the metadata of the new aggregation file by using the metadata of temporary deletion file so as to update the metadata of the temporary deletion file; and deleting one or more objects corresponding to the metadata of the temporary deletion file from the new aggregation file so that the object of the temporary deletion file corresponds to that of the new aggregation file.

12. The system according to claim 11, wherein the method further comprises the step of:

substituting the temporary deletion file as a new deletion file corresponding to the new aggregation file.

13. The system according to claim 8, wherein the metadata comprises at least one of a: file name of the object, offset and size of the object in the aggregation file, and size of the object in the aggregation file.

14. The system according to claim 8, wherein the copying step further comprises: determining the position(s) of the deleted objects(s) based on the deletion file corresponding to the acquired aggregation file so as to copy the aggregation file by reading sequentially one or more large blocks(s) containing a plurality of remaining objects.

15. A computer-implemented method of storing an aggregation file, comprising:

storing a plurality of objects in one or more aggregation files by using an append-only technique;

recording metadata corresponding to the plurality of objects of the one or more aggregation files in an in-memory index corresponding to the respective aggregation file;

recording metadata corresponding to objects being deleted from the respective aggregation file in a specific deletion file;

acquiring one of the one or more aggregation files to be compressed, comprising:

calculating total deleted space of the respective aggregation file; and selecting the aggregation file having the maximum total deleted space as the aggregation file to be compressed.

16. The computer-implemented method according to claim 15, wherein the metadata each object in the plurality of objects comprises at least one of a: filename of the object, offset of the object in the aggregation file and size of the object in the aggregation file.

17. A system of storing an aggregation file, the system comprising:

one or more aggregation file sections in which each section stores a plurality of objects in an aggregation file using an append-only technique;

one or more in-memory index sections in which each section records metadata corresponding to the plurality of objects of the corresponding aggregation file; and one or more specific deletion file sections in which each section records metadata corresponding to objects being deleted from the corresponding aggregation file;

wherein the system is configured to:

calculate a total deleted space of each of the one or more aggregation file sections; and select an aggregation file section having the maximum total deleted space as the aggregation file section to be compressed.

18. The system according to claim 17, wherein the metadata of each object in the plurality of objects comprises at least one of a: filename of the object, offset of the object in the aggregation file and size of the object in the aggregation file.

* * * * *